United States Patent Office 3,452,070
Patented June 24, 1969

3,452,070
BRIDGED DINUCLEAR GROUP VIII METAL CARBONYLS CONTAINING TWO DIFFERENT BRIDGING LIGANDS
David Thomas Thompson, Runcorn, England, assignor to Imperial Chemical Industries Limited, Millbank, London, England, a corporation of Great Britain
No Drawing. Filed June 30, 1966, Ser. No. 561,760
Claims priority, application Great Britain, July 8, 1965, 29,006/65
Int. Cl. C07f 15/02, 9/02; C08f 1/28
U.S. Cl. 260—439                             7 Claims

ABSTRACT OF THE DISCLOSURE

A bridged dinuclear carbonyl complex of transition metals in which the bridging ligands are different, and each ligand contains an electron donating atom co-ordinated with both transition metals. The complex is useful as a catalyst in, for example, polymerization reactions.

---

This invention relates to complex compounds of transition metals and especially to bridged dinuclear carbonyl complexes. Compounds are known of the general formula represented by:

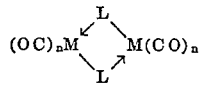

where M is a transition metal, L is a bridging ligand and $n$ is an integer. I have found that compounds may be made similar to those shown above in which the two bridging ligands L are different.

Accordingly the present invention provides bridged dinuclear transition metal carbonyl complexes in which the bridging ligands are different and each of said ligands contains an electron-donating atom co-ordinated with both transition metals.

Suitable electron donating atoms are those of Group V–B and VI–B of the Periodic Table, such as sulphur and phosphorus.

The carbonyl groups in the compounds of the present invention may be partially replaced by one or more other ligands.

By "transition metal" I mean elements having atomic numbers within the ranges 21–30, 39–48 and 57–80 inclusive. Especially suitable transition metals are iron, molybdenum, chromium, and tungsten, particularly iron.

The compounds of the present invention include those which may be represented by the following formulae, including isomeric variations, but the present invention does not depend upon the precise structural accuracy of these formulae.

I
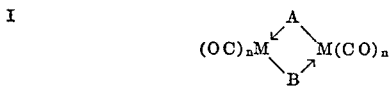

II
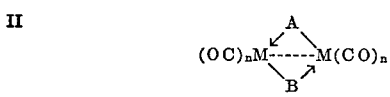

where M is a transition metal, A and B are different bridging ligands, $n$ is a number (not necessarily the same in each formula or part thereof) as required to satisfy the co-ordination requirements of M. One or more of the carbonyl groups of Formulae I and II may be replaced by substituent ligands which may be the same or different. It is preferred that the substitutent ligands contain an electron-donating atom, for example phosphorus. In some compounds, depending on the nature of the transition metal, bonding may occur between the two transition metal atoms as indicated by the dotted line in Formula II above. Examples of the ligand A include radicals notionally derived from organic substituted phosphines especially phosphines substituted with hydrocarbon radicals or substituted hydrocarbon radicals, for example dialkylphosphido (especially dimethyl- or diethyl-phosphido), or diarylphosphido, (especially diphenylphosphido groups). The ligand B may be an organic sulphur-containing ligand for example an alkyl or aryl sulphide, especially phenyl sulphide.

The compounds of the present invention are useful as catalysts in a variety of organic reactions. For example, they may be used as initiators in polymerisation reactions especially in conjunction with halogenated organic compounds. The compounds may also be used as carbonylation catalysts, for example in the preparation of urethanes wherein hydroxyl-containing organic compounds are reacted with carbon monoxide and organic nitro compounds.

The compounds of the present invention may be made by contacting a transition metal carbonyl with a compound or mixture of compounds containing the appropriate electron-donating atoms, such as a mixture of an organic phosphine and an organic sulphide. The reaction is conveniently performed in an inert solvent between ambient temperature and 200° C., using approximately stoichiometric proportions of reactants. An inert atmosphere should be used when the reactants are unstable and although pressure is not usually critical it may be convenient to use elevated pressures.

The invention is illustrated by, but not limited to, the following examples.

Example 1

Phenylthiodiphenylphosphine (0.8 g.) and iron pentacarbonyl (1.1 ml.) in benzene (5 ml.) were heated for 24 hours at 150° C. in a sealed tube previously flushed with nitrogen. The product was purified by recrystallisation from light petroleum (B.P. 60–80° C.). Elemental analysis (Found, C, 49.9; H, 2.6; P, 6.0; S, 6.2; $C_{24}H_{15}Fe_2O_6PS$ requires C, 60.2; H, 2.6; P, 5.4; S, 5.6) was consistent with a structure represented by the formula:

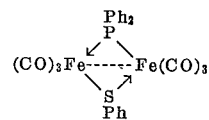

Yield 55% Orange powder, M. Pt. 163–166° C.

Example 2

The product of Example 1 (0.60 g.) was refluxed in cyclohexane (150 ml.) with triphenylphosphine (0.55 g.) and irradiated with visible light for 33 hours. The product was recrystallised from a toluene/light petroleum mixture (B. Pt. 40–60° C.) and is thought to have a structure corresponding with the formula:

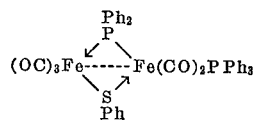

Yield 40% Red prisms, M. Pt. 170–172° C.

I claim:
1. A bridged dinuclear transition metal carbonyl compound in which the bridging ligands are different, one bridging ligand being a hydrocarbon substituted sulphide group and a second bridging ligand being a hydrocarbon substituted phosphine group, the transition metal being from Group VIII of the Periodic Table.

2. A compound according to claim 1 in which the hydrocarbon substituents are all phenyl groups.

3. A compound according to claim 1 in which the Group VIII transition metal is iron.

4. A compound as claimed 1 in which at least one of the carbonyl groups is replaced by a substituent ligand containing an eletcron donating atom co-ordinated with one of the transition metal atoms.

5. A compound as claimed in claim 4 in which the substituent ligand is selected from alkyl and aryl substituted phosphines.

6. A process for the preparation of a compound according to claim 1 which comprises contacting a Group VIII transition metal carbonyl with a hydrocarbon substituted thiophosphine.

7. A process according to claim 6 in wihch the thiophosphine is phenylthiodiphenylphosphine.

References Cited

Grobe: Z. Anorg Allg. Chem., vol. 331 (1964), pp. 63–84.

King et al.: J. Am. Chem. Soc., vol 83 (1961), p 3600.

Hayter: J. Am. Chem. Soc., vol. 85 (1963), pp. 3120–4.

Emeléus et al.: Angew Chem., vol. 74 (1962), p. 467.

TOBIAS E. LEVOW, *Primary Examiner.*

A. P. DEMERS, *Assistant Examiner.*

U.S. Cl. X.R.

204—158; 252—431; 260—429, 482